Patented Dec. 25, 1934

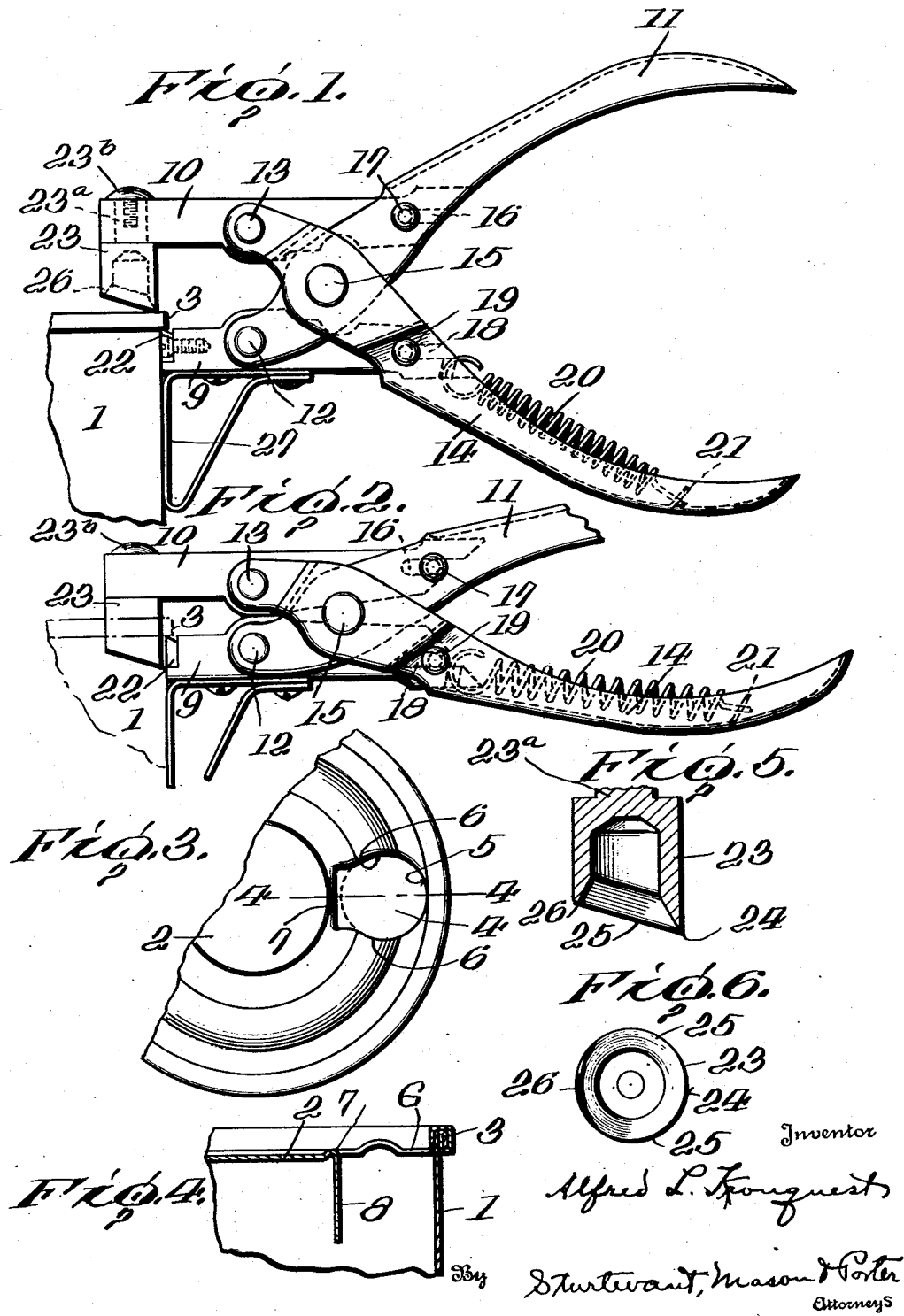

1,985,862

UNITED STATES PATENT OFFICE 1,985,862

TOOL FOR FORMING A DISPENSING OPENING IN THE END WALL OF A SEALED CONTAINER

Alfred L. Kronquest, Syracuse, N. Y., assignor to Continental Can Company, Inc., New York, N. Y., a corporation of New York Application June 17, 1932, Serial No. 617,910

2 Claims. (Cl. 164—121)

The invention relates to new and useful improvements in a tool or device for forming a dispensing opening in the end wall of a container.

An object of the invention is to provide a tool whereby an opening may be cut through the end wall of sufficient size to permit the contents of the container to be dispensed through said opening without the aid of any spout or other dispensing means.

In the drawing—

Figure 1 is a view in side elevation showing a tool embodying the invention with the cutter raised and positioned on the container for the cutting of the opening therethrough;

Fig. 2 is a view similar to Fig. 1, but showing the cutter depressed and the opening formed in the container;

Fig. 3 is a plan view of the container with the opening therein;

Fig. 4 is a sectional view on the line 4—4 of Fig. 3;

Fig. 5 is a sectional view through a portion of the cutter.

Fig. 6 is a bottom plan view of the cutter.

Various tools have been constructed for cutting out the end of a container to give access to the contents thereof. Devices have been provided which are adapted to be attached to containers to aid in the dispensing of the contents, which devices carry a cutter for cutting an opening through the wall of the container.

The present invention has to do with a tool for forming an opening on the end wall of a container through which the contents of the container may be rendered accessible or may be discharged in a relatively small stream. In Figures 3 and 4 of the drawing, a container is shown which includes a body portion 1 and an end wall or top 2, which is secured to the body portion by a seam 3 which, as shown, is the ordinary double seam. As far as the present invention is concerned, this seam may be of any desired character, but of a form which projects or overhangs the outer face of the wall of the body portion 1. The end wall is shown in the drawing as having an opening 4 therethrough. This opening 4 is formed in the end wall by cutting the end wall along the curved portion 5 and also the curved portion 6, 6. The wall is not cut along the portion 7. Thus the opening is formed by cutting the metal on three sides thereof. The cut portion 8 is bent downward as indicated in Fig. 4, hinging about a connection along the portion 7 of the opening. This cut-away portion is forced downward into the container a sufficient distance so as to provide a free opening through which the contents of the container may be dispensed.

The invention has to do particularly with a tool for forming this dispensing opening in the end wall of a container. The tool includes a lower jaw member 9 and an upper jaw member 10. Pivotally attached to the lower jaw member 9 is a lever 11. Said lever is pivoted at 12 to the jaw member. Also pivoted at 13 to the upper jaw member 10 is a lever 14. These two levers are pivoted together at 15. The upper jaw member has a horizontal slot 16 therein which engages a pin 17 carried by the lever 11. The lower jaw member has a slot 18 therein which engages a pin 19 carried by the lever 14. A spring 20 is attached to the lower jaw member and at 21 to the lever 14. This spring normally tends to move the free ends of the levers 11 and 14 away from each other. The levers are shaped so that the operator grasps the two levers with the hands, and forces the free ends of the levers toward each other. The levers are pivoted together at 15, and when the outer ends move toward each other, the inner ends or the pivot points 12 and 13 will likewise move toward each other. The pins 17 and 19 will likewise move toward each other. The distance between the pivot point 13 and the pin 17 will increase as the levers are moved toward each other. Likewise, the distance between the pivot point 12 and the pin 19 will increase. The slots 16 and 18 permit the pins 17 and 19, respectively, to move outwardly along the jaws, as viewed in Fig. 1. This will put the spring 20 under tension, so that when the levers are released, the contraction of the spring will separate the jaw members.

The jaw member 9 as shown in the drawing is recessed, and seated in the recess is a member 22 which forms a shoulder or an abutment at the extreme upper inner free end of the jaw. This is a hardened steel piece, and it may be omitted and the jaw itself shaped to provide a shoulder or abutment. The jaw 10 overhangs or projects beyond the end of the jaw 9, as clearly shown in the drawing. Attached to the outer free end of the jaw 10 and depending therefrom is a cutter 23. The cutter 23 has a reduced portion 23$^a$ fitting in a socket in the jaw 10 and is held in by a screw 23$^b$ which is threaded into the cutter and is provided with a head overlying the jaw. This screw will draw the shoulder of the cutter tightly against the under face of the jaw. This cutter, as clearly shown in Figures 5 and 6, has a cutting point 24, and the cutting edge 25 leading therefrom inclines upwardly and terminates on the opposite side of the cutter in more or less of a blunt portion 26. As shown in the drawing, the jaw 9 is provided with a bracket member 27 which is rigidly attached to the jaw and projects downwardly therefrom. The purpose of this bracket member is to rest against the side wall of the container so as to prevent the bending or bowing in of the side wall, and so as to bring about a substantially vertical movement of the cutter 23 as it penetrates the can end.

When it is desired to form a dispensing opening in the end wall of a container, the end of the jaw 9 and the bracket 27 are placed against the wall with the shoulder directly beneath the projecting seam. When in this position, the cutter 23 overlies the end and is so positioned relative to the shoulder that it is slightly above the end seam, thus permitting the placing of the tool against the wall of the container by a direct forward movement of the tool. When the levers 11 and 14 are moved toward each other, the cutter 23 will move bodily downward in a line or path substantially parallel with the side wall of the body portion 1 of the container. The jaw 10 retains its parallel relation to the jaw 9, and moves bodily toward and from the jaw 9 by the devices which have been described in detail above. This is what gives to the cutter a movement in a direction at right angles to the jaw 9 throughout the entire extent of movement imparted to the cutter. The point of the cutter 24 first penetrates the metal close to the end seam, and the inner wall of the container body. The cutting of the metal progresses to each side of the cutting point until the metal is finally severed along the three sides 5, 6 and 6, as described above. The cutter then will force the cut portion inward, swinging the same about the in-cut side 7 as a hinge and positively force said portion 8 to the position shown in Fig. 4. The cutter is circular in cross section and the curved blunt portion 26 will force the metal as it is turned downward so as to tear the metal in line with the cut portions 6, 6. This places the bend in the metal substantially in a straight line and facilitates the turning of the metal to a substantially vertical position about its connection to the end as a hinge.

By reason of the fact that the cutter 23 moves in a path parallel with the inner wall of the container, it can move to any distance permitted by the operating mechanism, and therefore, it can be moved down into the container a sufficient distance not only to cut the metal, but to bend downward the cut-out portion, and thus completely form the opening through which the contents is to be dispensed.

It will be understood, of course, that an opening of a similar character may be made diametrically opposite the dispensing opening for venting purposes, or a plurality of openings may be made side by side to hasten the dispensing of the contents, but the opening is sufficiently large so that the contents may be poured therefrom through a single opening, if desired. The opening also gives access so that a straw or an equivalent means may be inserted for drawing the contents from the container. The opening is preferably restricted so that when liquid content is poured from the container, it will be discharged in a formed stream which can be readily directed into receiving spouts of the character used in connection with the crank casing of an automobile. The tool, therefore, readily provides a means for opening containers for orange juice, tomato juice or the like, and also for opening containers for lubricating oil as sold in original sealed containers at filling stations.

While a specific means has been shown for imparting a parallel motion to the movable jaw, it will be understood that other ways may be devised for giving to the cutter a movement parallel with the inner wall of the container body, so as to facilitate the cutting of the end wall close to the double seam, and a complete emptying of the contents thereof through the dispensing opening.

Having thus described the invention, what I claim as new and desire to secure by Letters Patent, is—

1. A tool for forming a dispensing opening in a container end comprising a lower jaw having a shoulder at its free end adapted to engage the under side of the projecting double seam of a can end, the outer face of said jaw being disposed so that when in contact with the outer wall of the can body, the jaw is maintained substantially at right angles to the wall of the can body, an upper jaw having its free end overhanging and projecting beyond the end of the lower jaw and adapted to overlie the double seam, means connecting said jaws whereby the upper jaw may be forcibly moved toward and from the lower jaw while maintained in parallelism relative thereto, a cutter mounted on said upper jaw and depending therefrom and movable in a path parallel with the side wall of the container for forming a dispensing opening, said cutter having a penetrating point for penetrating the metal adjacent the double seam, and inclined cutting edges leading away from the penetrating point toward the center of the container for cutting the metal adjacent the double seam along spaced lines and rolling said metal downwardly and inwardly to form a free and unobstructed dispensing opening.

2. A tool for forming a dispensing opening in a container end comprising a lower jaw having a shoulder at its free end adapted to engage the under side of the projecting double seam of a can end, a bracket carried by said jaw and having the outer face thereof in alinement with the outer end of the jaw for contact with the outer wall of the can body, said faces being disposed so that the jaw is maintained substantially at right angles to the wall of the can body, an upper jaw having its free end overhanging and projecting beyond the end of the lower jaw and adapted to overlie the double seam, means connecting said jaws whereby the upper jaw may be forcibly moved toward and from the lower jaw while maintained in parallelism relative thereto, a cutter mounted on said upper jaw and depending therefrom and movable in a path parallel with the side wall of the container for forming a dispensing opening, said cutter having a penetrating point for penetrating the metal adjacent the double seam, and inclined cutting edges leading away from the penetrating point toward the center of the container for cutting the metal adjacent the double seam along spaced lines and rolling said metal downwardly and inwardly to form a free and unobstructed dispensing opening.

ALFRED L. KRONQUEST.